United States Patent
Maier et al.

(10) Patent No.: US 9,511,733 B2
(45) Date of Patent: Dec. 6, 2016

(54) PROTECTIVE DEVICE FOR A COMPARTMENT SECTION OF A MOTOR VEHICLE

(71) Applicant: BOS GMBH & CO. KG, Ostfildern (DE)

(72) Inventors: Matthias Maier, Esslingen (DE); Huan Tran, Ostfildern (DE); Wolfgang Schaller, Denkendorf (DE); Herbert Walter, Ebersbach (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/646,224

(22) PCT Filed: Nov. 21, 2013

(86) PCT No.: PCT/EP2013/074416
§ 371 (c)(1),
(2) Date: May 20, 2015

(87) PCT Pub. No.: WO2014/079950
PCT Pub. Date: May 30, 2014

(65) Prior Publication Data
US 2015/0291118 A1     Oct. 15, 2015

(30) Foreign Application Priority Data

Nov. 26, 2012   (DE) .................... 10 2012 221 586

(51) Int. Cl.
*B60N 3/00*     (2006.01)
*B60R 21/06*    (2006.01)

(52) U.S. Cl.
CPC .......... *B60R 21/06* (2013.01); *B60R 2021/065* (2013.01)

(58) Field of Classification Search
CPC .......................... B60R 21/06; B60R 2021/065
See application file for complete search history.

(56) References Cited

U.S. PATENT DOCUMENTS

| 5,551,726 A | 9/1996 | Ament |
| 5,727,836 A * | 3/1998 | Hosoya ................ B60R 5/047 296/37.1 |

(Continued)

FOREIGN PATENT DOCUMENTS

| CN | 102317114 A | 1/2012 |
| CN | 102465659 A | 5/2012 |

(Continued)

OTHER PUBLICATIONS

International Search Report issued in International Application No. PCT/EP2013/074416 with English translation dated Feb. 20, 2014 (4 pages).

(Continued)

*Primary Examiner* — Lori L Lyjak
(74) *Attorney, Agent, or Firm* — Flynn, Thiel, Boutell & Tanis, P.C.

(57) ABSTRACT

Protective device with a flexible sheet-like structure movable between a compactly stored position and at least one two-dimensionally extended functional position and which is provided, on an end region thereof with a dimensionally stable extension profile which, at opposite ends, has retaining profile sections mounted so as to be displaceable telescopically to a limited extent in the extension profile and acted upon outwardly in the longitudinal direction of the extension profile by a spring arrangement. Each retaining profile section is assigned a second spring arrangement which acts on the retaining profile section in the opposite direction to the first spring arrangement. The retaining profile section, in an unloaded non-operational position, is held on the extension profile in a central position, from (Continued)

which the retaining profile section can be shifted inward or outward in opposite longitudinal directions relative to the extension profile.

6 Claims, 5 Drawing Sheets

(56) References Cited

U.S. PATENT DOCUMENTS

| | | |
|---|---|---|
| 6,488,325 B1 | 12/2002 | Ehrenberger et al. |
| 8,419,102 B2 | 4/2013 | Takemura |
| 2011/0260484 A1 | 10/2011 | Takemura |
| 2011/0266822 A1* | 11/2011 | Takemura ............... B60R 21/06 |
| | | 296/24.43 |

FOREIGN PATENT DOCUMENTS

| | | |
|---|---|---|
| DE | 43 36 380 A1 | 4/1995 |
| DE | 199 40 602 A1 | 4/2001 |
| DE | 20 2004 007 743 U1 | 10/2005 |
| EP | 1 889 755 A2 | 2/2008 |
| EP | 2 174 839 A1 | 4/2010 |
| JP | H5-44381 A | 2/1993 |

OTHER PUBLICATIONS

Office Action of Chinese Patent Office issued in Application No. 201380061589.X with English translation dated May 23, 2016 (11 pages).

\* cited by examiner

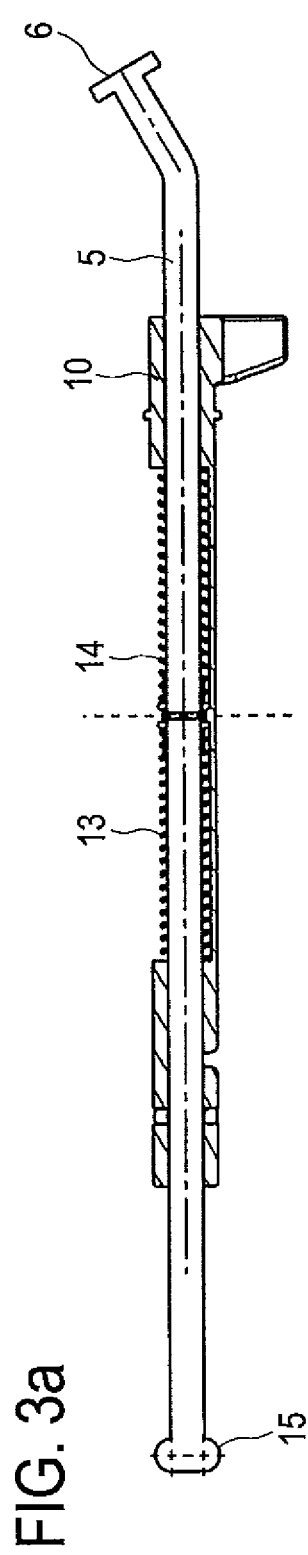
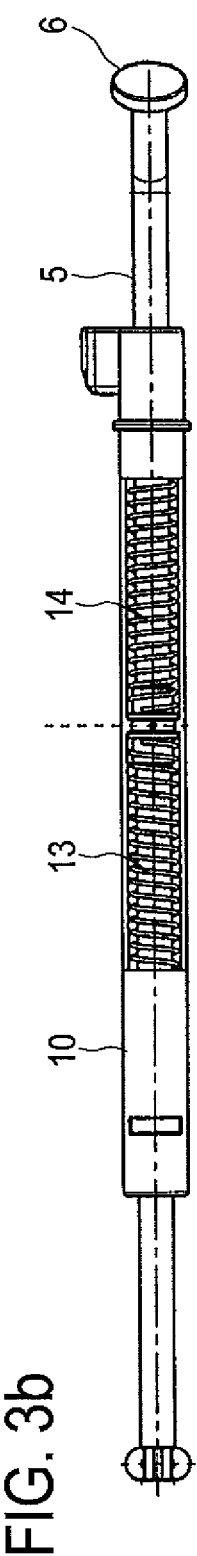
FIG. 3a
FIG. 3b

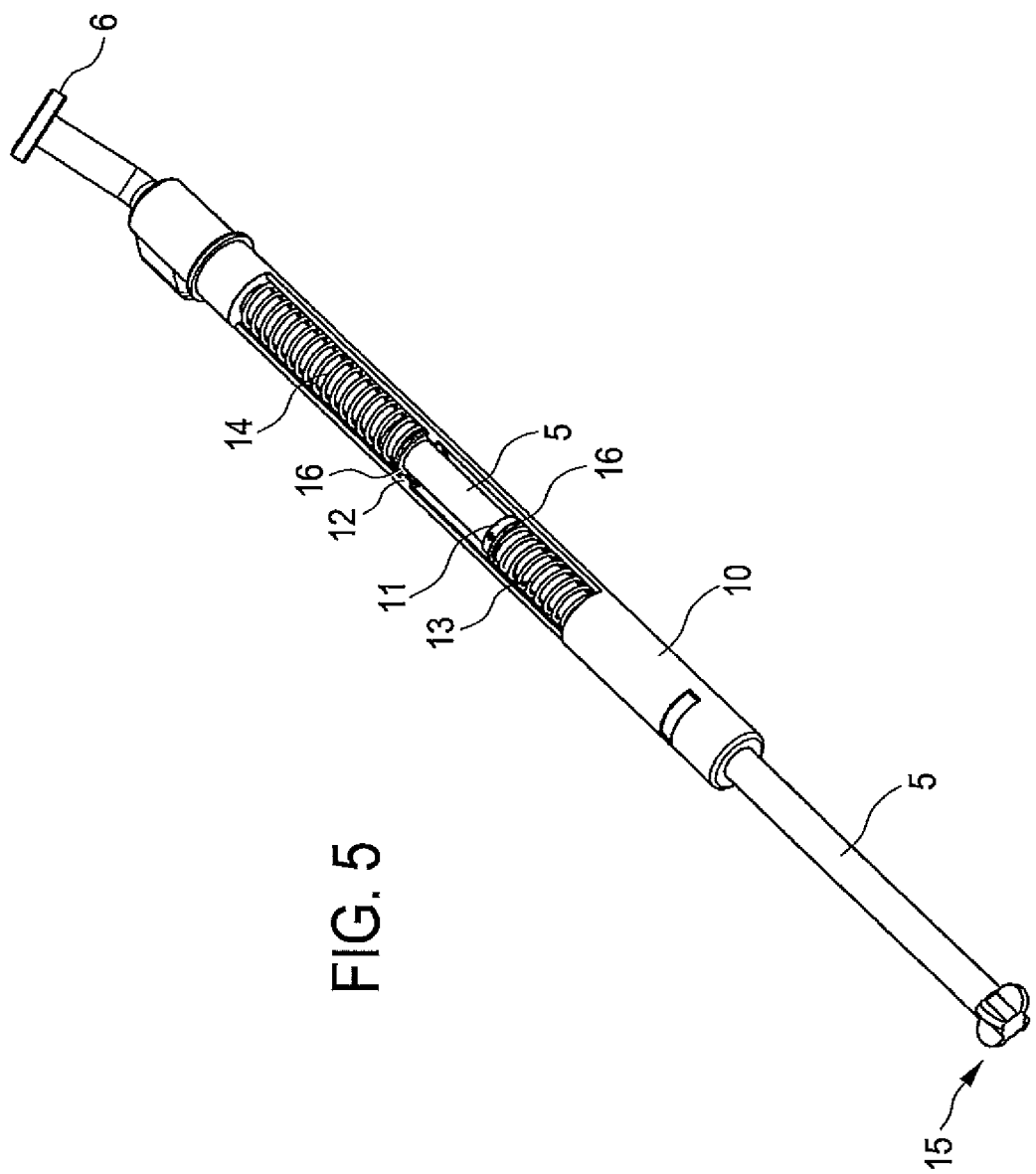

PROTECTIVE DEVICE FOR A COMPARTMENT SECTION OF A MOTOR VEHICLE

FIELD OF THE INVENTION

The invention relates to a protective device for a compartment section of a motor vehicle, with a flexible sheet-like structure which is movable between a compactly stored position and at least one at least partially two-dimensionally extended functional position and which is provided, on the end region thereof to the front in the extension direction, with a dimensionally stable extension profile which, at opposite ends, has retaining profile sections that are mounted so as to be displaceable telescopically to a limited extent in the extension profile and that are acted upon outwardly in the longitudinal direction of the extension profile by a spring arrangement.

BACKGROUND OF THE INVENTION

A protective device within the meaning of the invention includes restraining devices for separating a loading space from a passenger compartment, loading-space covers for approximately horizontal coverage of an upwardly open loading space, shading devices for rear windows, side windows or transparent roof areas, or residual trunk compartment covers, which are used to separate a residual trunk compartment relative to a top receiving space for a movable roof area that can be lowered in a trunk, preferably in the form of a soft top or of a dimensionally stable folding roof consisting of roof parts that are mounted pivotably relative to one another.

A protective device in the form of a restraining device that can be deployed vertically between a loading space and a passenger compartment is known from DE 43 36 380 A1. The known restraining device has a flexible separating net that is mounted so as to be movable between a non-operational position, wound up on a winding shaft, and a deployed protective position. The separating net is provided, on its end region to the front in the extension direction, with a dimensionally stable extension profile which is provided, at its opposite end sides, with a hollow profile area in which a retaining profile section is mounted so as to be displaceable telescopically and which is provided, at its outer lying end, with a mushroom-shaped hooking pin. The retaining profile section on each end of the extension profile is mounted so as to be movable telescopically to a limited extent in the hollow profile area of the extension profile and is stressed by the spring force of a compression spring to its outer end position. An inward pressing of each retaining profile section therefore takes place counter to the spring force of the compression spring. The mobility of the retaining profile sections relative to the extension profile is provided in order to permit a tolerance compensation when hooking the retaining profile sections in roof-side holders of the extension profile. Moreover, the compression springs ensure that the hollow profile sections in the hooked-in state are pressed by the compression spring, such that rattling noises are reduced.

DE 199 40 602 A1 discloses a loading space cover that can be pulled out more or less horizontally and that is provided with a flexible sheet-like structure in the form of a covering tarpaulin. At its front end in the direction of extension, the covering tarpaulin has a dimensionally stable extension profile which, at its mutually opposite end regions, is provided with telescopically movable retaining profile sections, which comprise hooking pins shaped like mushroom heads. These retaining profile sections are subjected to a spring force which pushes them outward in the same way in the longitudinal direction and which is exerted in each case by a compression spring.

SUMMARY OF THE INVENTION

The object of the invention is to make available a protective device which is of the kind mentioned at the outset and which has further improved possible uses in relation to the state of the art.

This object is achieved by the fact that each retaining profile section is assigned a second spring arrangement which acts on the retaining profile section in the opposite direction to the first spring arrangement, and that the retaining profile section, in an unloaded non-operational position, is held on the extension profile in a central position, from which the retaining profile section can be shifted inward or outward in opposite longitudinal directions relative to the extension profile. It is thus possible to connect the extension profile to different vehicle-side holders that are at different distances from each other. The solution according to the invention permits a dual-action tolerance compensation, since the hollow profile sections can be moved both inward and also outward from the non-operational position. A corresponding spring loading is ensured in both longitudinal directions, such that the retaining profile sections are pre-stressed in both longitudinal directions from the non-operational position. The solution according to the invention allows the extension profile to be secured in different functional positions of the flexible sheet-like structure, such that the possibilities of variation in the use of a protective device are improved. The solution according to the invention is suitable for all types of the above-described protective devices.

In one embodiment of the invention, the two spring arrangements, which act on each retaining profile section, are designed with spring forces of identical magnitude. The spring arrangements can be designed as compression spring arrangements or tension spring arrangements.

In a further embodiment of the invention, an axially fixed stop ring, on which both spring arrangements bear, is arranged on each retaining profile section centrally between the spring arrangements. The stop ring on the retaining profile section defines a central position for the retaining profile section relative to the extension profile and relative to the two associated spring arrangements.

In a further embodiment of the invention, both spring arrangements are designed as helical springs which, at their end regions directed toward the stop ring, are provided with in each case one support ring, and the support rings flank opposite axial sides of a stop web, arranged axially rigidly on the extension profile, and are able to bear axially on the stop web. The stop web is provided in the area of a central position of the retaining profile section and is a fixed component part of the extension profile. When the retaining profile section shifts inward or outward from its central position relative to the extension profile, the bearing on the stop web ensures that one of the two spring arrangements is decoupled, such that at all times only one of the two spring arrangements exerts a spring load on the retaining profile section. Therefore, in functional terms, the two spring arrangements are connected in parallel.

In a further embodiment of the invention, an inner contour of the stop web of the extension profile is arranged at a radial distance from an outer contour of the stop ring movable with the retaining profile section, in order to allow the stop ring to move axially past the stop web. Therefore, when the retaining profile section shifts, the stop web rigidly connected to the extension profile holds back only one spring arrangement. The retaining profile section itself can move with its stop ring axially past the stop web and is not impeded by the stop web.

In a further embodiment of the invention, the two retaining profile sections are operatively connected to the extension profile by means of energy-absorbing deformation elements. This embodiment is advantageous for protective devices in the form of restraining devices or in the form of loading space covers. In the event of a crash, in which the extension piece is substantially bent, the retaining profile sections can shift relative to the extension profile with simultaneous reduction of deformation energy. This function corresponds to the function of the energy-absorbing deformation arrangements serving as force limiters, of the kind known from DE 43 36 380 A1 and DE 199 40 602 A1.

BRIEF DESCRIPTION OF THE DRAWINGS

Further advantages and features of the invention will become clear from the following description of a preferred exemplary embodiment of the invention, which embodiment is shown in the drawings.

FIG. 3b shows a plan view of the partial area according to FIG. 3a, FIG. 4a shows a view similar to FIGS. 2a and 3a, with the retaining profile section shifted axially inward in relation to the extension profile.

DETAILED DESCRIPTION

Figure 1:
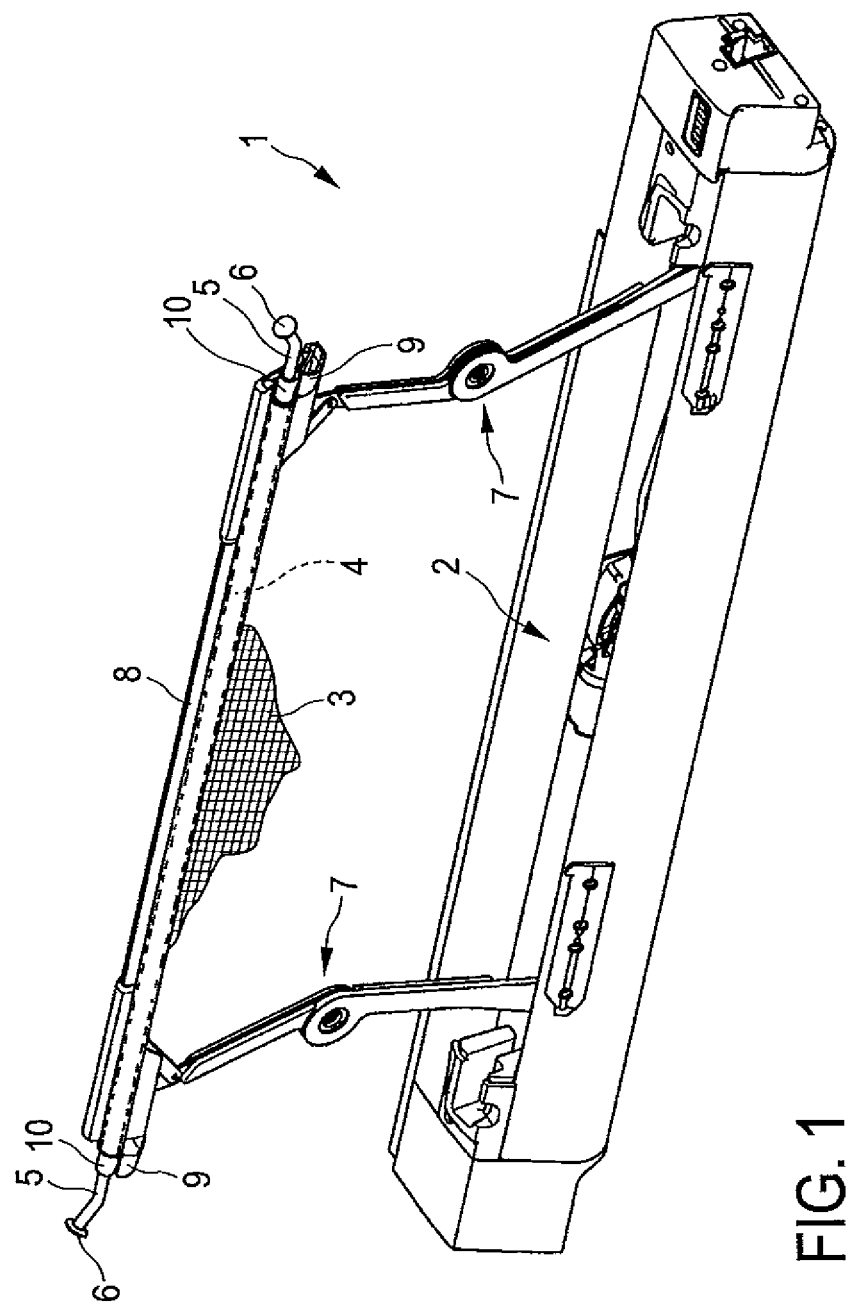
FIG. 1 shows a perspective view of an embodiment of a protective device according to the invention in the form of a restraining device between a loading space and a passenger compartment within a vehicle interior.

A protective device in the form of a restraining device 1 according to FIG. 1 has a flexible sheet-like structure in the form of a separating net 3, which is held on a winding shaft in a manner such that it can be wound up and unwound. The winding shaft is mounted rotatably in a cassette housing 2. In the operational state within a vehicle interior, the cassette housing 2 is positioned behind a backrest arrangement of a rear seat bench in the transverse direction of the vehicle and is mounted releasably in side breasts of a loading space. The loading space merges in an open manner into a passenger compartment of the vehicle interior. The restraining device 1 serves to hold back loaded goods which, in the event of a vehicle impact, may be propelled forward from the loading space in the direction of the passenger compartment. Moreover, when the backrest arrangement is folded forward, the cassette housing 2 can also be mounted on the rear face of the backrest arrangement. The separating net 3 is of such considerable length that, even when the backrest arrangement is folded forward, the separating net can span the vehicle interior in the vertical direction of the vehicle as far as a roof area of the vehicle interior. In the folded position of the backrest arrangement, the rear face of the backrest arrangement forms a forward continuation of a loading floor of the loading space. To be able to fix the separating net 3 to the roof in both assembly positions of the cassette housing 2, i.e. both in the area of the side breasts of the loading space and also in the area of the forwardly folded backrest arrangement in the deployed functional position, both assembly positions in the roof area are assigned corresponding roof-side holders.

To releasably fix the separating net 3 in the deployed functional position in the respective roof-side holders, the separating net 3 has, on its end region to the front in the extension direction, a dimensionally stable extension profile 4 which extends across the full width of the separating net 3. At least at its opposite ends, the extension profile 4 is provided with outwardly open cavities in each of which a retaining profile section 5 is mounted so as to be displaceable telescopically. Each retaining profile section 5 protrudes axially outward beyond the end of the extension profile 4 and is provided, at its outer end, with a bent area and with a mushroom-shaped hooking pin 6. By means of this hooking pin 6, each retaining profile section 5 can be anchored releasably in an assigned roof-side holding receptacle of the roof-side holder.

In order to transfer the separating net 3 from its non-operational position to the deployed functional position, wound up on the winding shaft inside the cassette housing 2, lifting mechanism 7, 8 is provided which, by means of a drive, lifts the extension profile 4 and moves it upward. For this purpose, a lifting profile 8 of the lifting mechanism 7, 8 has two carriers 9 which engage under the extension profile 4, at the opposite ends thereof, and carry it upward.

In the two different assembly positions of the cassette housing 2, the mutually opposite holding receptacles of the respective roof-side holder are fixed at different distances from each other in the transverse direction of the vehicle. These different positions can be compensated for by the telescopic longitudinal mobility of both retaining profile sections 5 relative to the extension profile 4. By corresponding axial inward sliding or outward sliding of the retaining profile sections 5, the hooking pins 6 can be positioned exactly flush with the corresponding roof-side holding receptacles, such that a simple fit into the roof-side holding receptacles is then permitted.

Figure 2A:
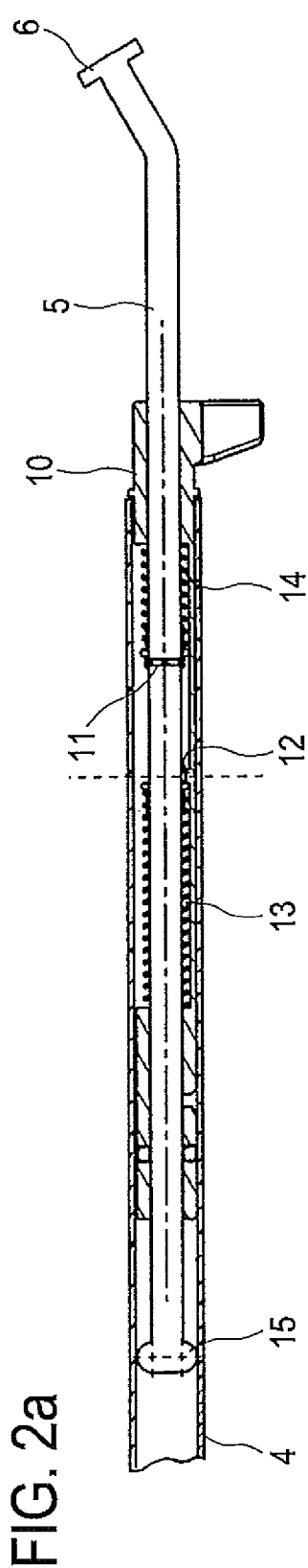
FIG. 2a shows a longitudinal sectional view through part of an extension profile of a separating net of the restraining device according to FIG. 1.
Figure 2B:
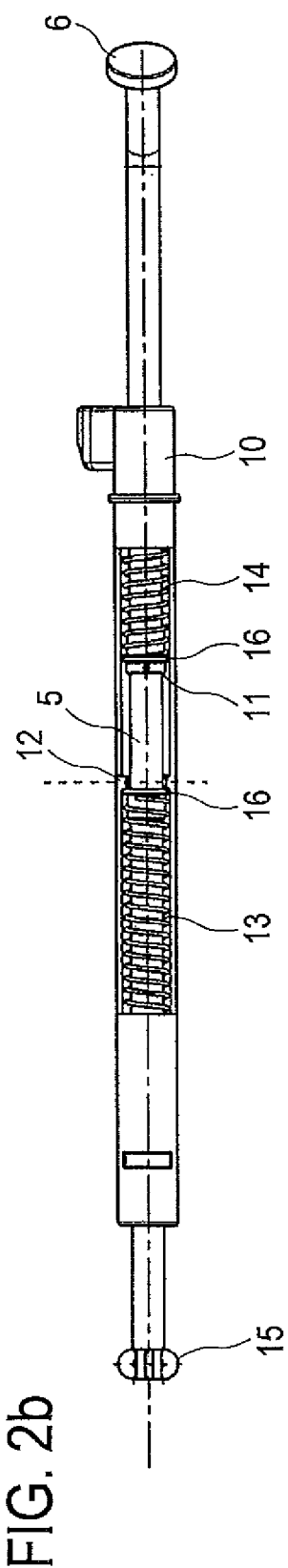
FIG. 2b shows a plan view of the partial area according to FIG. 2a, FIG. 3a shows the longitudinal section according to FIG. 2a with a retaining profile section located in its central position, and with omission of a tube portion of the extension profile.
Figure 4A:
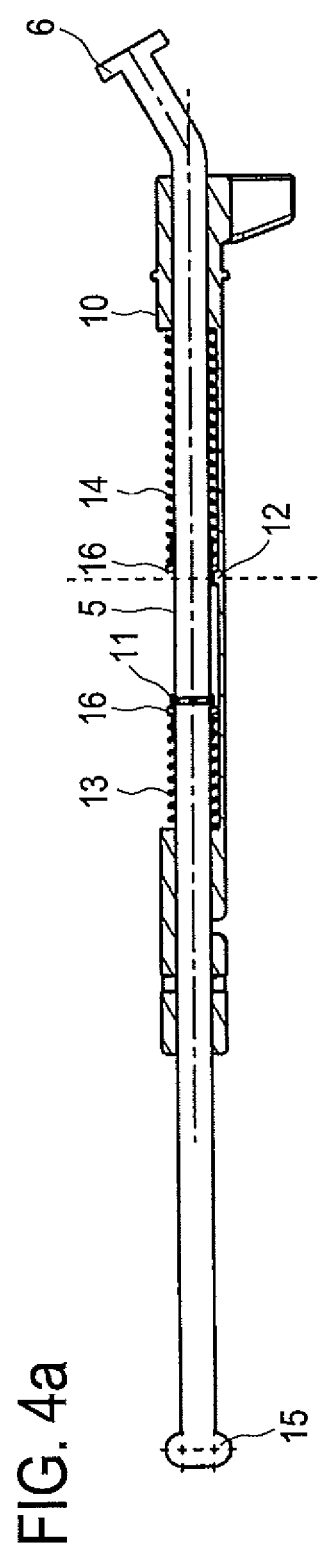
FIG. 4b shows a plan view of the partial area according to FIG. 4a, and FIG. 5 shows the partial area according to FIG. 4b in an enlarged isometric view.
Figure 4B:
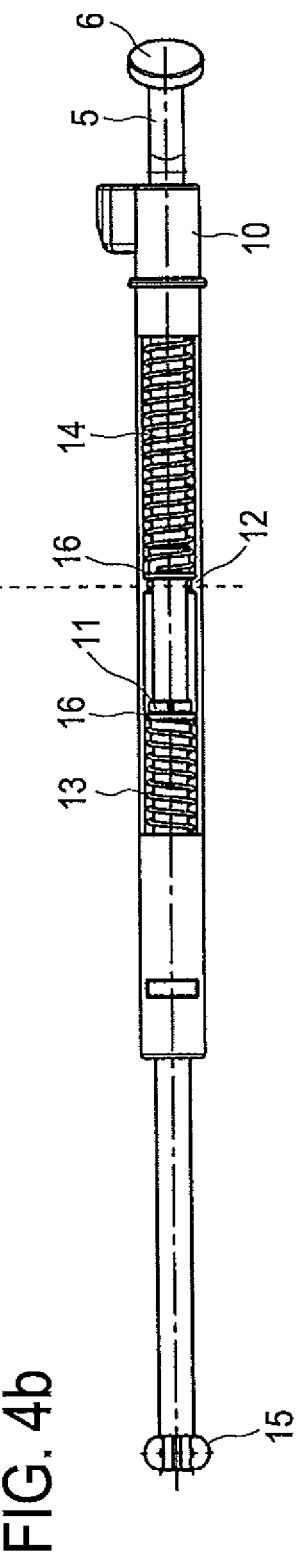

For the telescopic displaceability of each retaining profile section 5 in the corresponding end region of the extension profile 4, each tubular extension profile 4 has a hollow-profile-shaped insert piece 10, in which the retaining profile section 5 is guided in a linearly movable manner. The hollow profile section 10 is inserted into the end region of the extension profile 4 and is fixedly connected to the extension profile 4. In the inserted and fixed state, the hollow profile section 10 forms part of the extension profile 4. The hollow profile section 10 is open toward both axial sides. The retaining profile section 5 is designed in the manner of a cylindrical retaining rod and protrudes both axially inward and also axially outward past the hollow profile section 10. The retaining profile section 5 protrudes axially inward into a corresponding cavity of the extension profile 4, as can be seen from FIG. 2a. The hollow profile section 10 is groove-shaped in a central area and is open at the top, i.e. radially outward to one side, as can be seen from FIGS. 2b, 3b, 4b and 5. The cylindrical retaining profile section 5 has, approximately at the center, a stop ring 11 which is connected axially rigidly and rotationally rigidly to the retaining profile section 5 and protrudes radially outward from an outer jacket of the retaining profile section 5.

The groove-shaped area of the hollow profile section 10 has a stop web 12 in the form of a stop shoulder which, in a central position of the retaining profile section 5 (see the broken line in FIGS. 2a to 4b), is positioned at the same axial height as the stop ring 11 of the retaining profile section 5. The shoulder-like stop web 12 is provided in the middle of the groove-shaped area and thus halfway along the axial length of the groove-shaped area of the hollow profile section 10. The stop web 12 is an integral part of the hollow profile section 10 and protrudes radially inward from an inner wall of the groove-shaped area of the hollow profile section 10. However, the stop web 12 protrudes radially inward only to such an extent that the stop ring 11 protruding radially outward from the retaining profile section 5 can be guided axially past the stop web 12 without touching it.

Two mutually identical compression spring arrangements 13, 14 are embedded in the groove-shaped area of the hollow profile section 10 and are designed as helical compression springs. Both compression spring arrangements 13, 14 coaxially surround the retaining profile section 5. The compression spring arrangement 13 directed toward the center of the extension profile 4 bears on an axial support shoulder (not shown in detail) of the groove-shaped area of the hollow profile section 10 directed toward the center of the extension profile 4. The axially outer compression spring arrangement 14 bears with its axially outer end on a corresponding axially outer support shoulder of the axially outer end of the groove-shaped area of the hollow profile section 10 on the hollow profile section 10. At the mutually facing ends of both compression spring arrangements 13, 14, each compression spring arrangement 13, 14 has a support ring 16, of which the diameter is such that each support ring 16 can bear on the stop web 12 of the hollow profile section 10. Moreover, the support rings 16 are designed in such a way that they can also bear axially on the stop ring 11 of the retaining profile section 5.

An axially inwardly facing end of the retaining profile section 5 is provided with a radially outwardly protruding deformation element 15 which, in the event of a crash, comes into contact with a corresponding energy-absorbing deformation element of the extension profile 4 and, with a telescopic axial movement of the retaining profile section 5 relative to the extension profile 4, reduces the impact energy by corresponding deformation energy. This function corresponds to the function of the energy-absorbing deformation arrangement of the kind known from DE 199 40 602 A1. The same function is also known from DE 43 36 380 A1.

In a telescopic axial movement of the retaining profile section 5 away from the central position relative to the extension profile 4 and therefore relative to the hollow profile section 10 (see FIGS. 3a and 3b), the stop ring 11 necessarily carries with it the respective compression spring arrangement 13 or 14 axially outward (FIGS. 2a and 2b) or axially inward (FIGS. 4a and 4b), as a result of which the corresponding compression spring arrangement 13 or 14 is compressed. The respective other compression spring arrangement 13, 14 is held in the prestressed starting position by the stop web 12 connected axially rigidly to the extension profile 4, in which starting position the compression spring arrangement 13 or 14 extends between the support shoulder at the end of the hollow profile section 10 and the central stop web 12. Therefore, the correspondingly axially shifted retaining profile section 5 is always subjected only to the spring force of that compression spring arrangement 13 or 14 which is compressed on account of the axial shift. In the exemplary embodiment shown, both compression spring arrangements 13, 14 are identically dimensioned. In the unloaded non-operational state, the retaining profile section 5 is held positively in the central position in such a way that the stop ring 11 is located at the axial level of the stop web 12. Both the stop ring 11 and also the stop web 12 have at least substantially the same axial thickness, such that the retaining profile section 5 is held, in the central position, axially free of play by the compression spring arrangements 13, 14.

The invention claimed is:

1. A protective device for a compartment section of a motor vehicle, with a flexible sheet-like structure movable between a compactly stored position and at least one at least partially extended functional position, the sheet-like structure being provided, on an end region thereof towards a front in an extension direction, with a substantially rigid extension profile, the extension profile having retaining profile sections at respective opposite ends thereof that are mounted so as to be displaceable telescopically to a limited extent in the extension profile and that are each acted upon outwardly in a longitudinal direction of the extension profile by a first spring arrangement, and a second spring arrangement acts on each retaining profile section inwardly in an opposite direction to the first spring arrangement, each retaining profile section, in an unloaded non-operational position, being held on the extension profile in a central position, and each retaining profile section being shiftable inward or outward in opposite longitudinal directions relative to the extension profile.

2. The protective device as claimed in claim 1, wherein the first and second spring arrangements, are designed with spring forces of identical magnitude.

3. The protective device as claimed in claim 1, wherein the protective device further includes a stop ring mounted on each retaining profile section in an axially fixed manner relative thereto and centrally between the corresponding first and second spring arrangements, the first and second spring arrangements being disposed to selectively bear on the stop ring.

4. The protective device as claimed in claim 3, wherein the first and second spring arrangements are designed as helical springs having respective end regions directed toward the stop ring of the respective retaining profile section, each end region including a support ring, the support rings flanking opposite axial sides of a stop web arranged axially rigidly on the extension profile, the support rings being disposed to selectively bear axially on the stop web.

5. The protective device as claimed in claim 4, wherein an inner contour of the stop web of the extension profile is arranged at a radial distance from an outer radial contour of the stop ring movable with the retaining profile section to allow the stop ring to move axially past the stop web.

6. The protective device as claimed in claim 1, wherein the retaining profile sections are operatively connected axially to the extension profile by energy-absorbing deformation elements.

* * * * *